July 29, 1930.  F. J. EISENHARDT  1,771,749
BRAKE LINING
Original Filed May 24, 1924
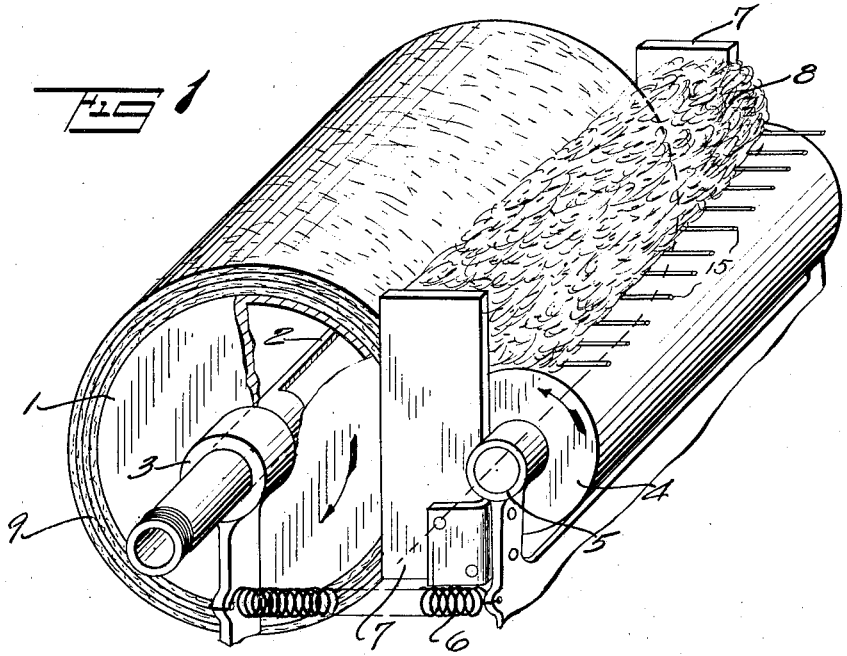
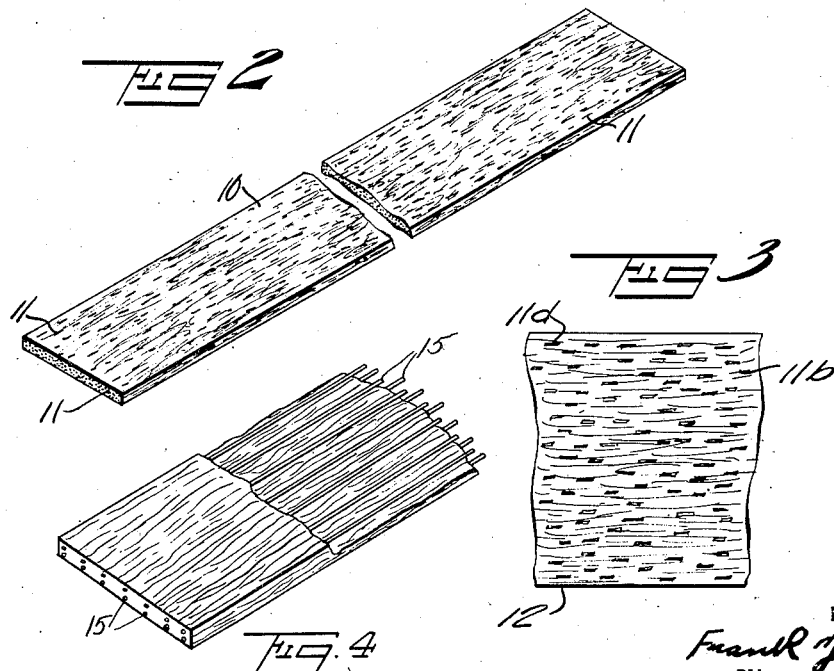
INVENTOR
Frank J. Eisenhardt
BY
ATTORNEY Patented July 29, 1930

1,771,749

UNITED STATES PATENT OFFICE

FRANK J. EISENHARDT, OF WAUKEGAN, ILLINOIS, ASSIGNOR, BY MESNE ASSIGNMENTS, TO JOHNS-MANVILLE CORPORATION, OF NEW YORK, N. Y., A CORPORATION OF NEW YORK

BRAKE LINING

Application filed May 24, 1924, Serial No. 715,715. Renewed February 9, 1928.

My invention relates to the production of sheets or slabs of material suitable for brake lining, and other articles in which toughness and great durability are required. It comprises a composite material having short links of binding or reinforcing material such as short bits of wire or fibre or both embedded in an originally plastic matrix and so disposed therein as to exert the most beneficial effect thereon as a binding material. Preferably I use a rubber compound for the matrix and a multiplicity of short bits of wire and asbestos fibre as the binder, but other materials having characteristics of the same general type could be used.

My invention is of particular value in that it affords a cheap and easy method of using up old asbestos brake bands originally made by weaving brass or copper wire covered with asbestos or cotton yarn into sheets or bands and water-proofing the same more or less. According to my present invention refuse scraps and worn out specimens of these brake bands are chopped up into small bits, shredded and thoroughly commingled in any suitable apparatus such as a Charles Ross mixer with a rubber compound which may contain any suitable filler and a proper proportion of sulphur if the product is to be vulcanized. The plastic mass so formed is then transferred to a sheet forming machine commonly employed for making sheets of rubber compositions, which machine consists essentially of a large roll or drum, made hollow so that it can be heated, and a cooperating smaller roll, unheated, the two being forced together by yielding pressure and revolved in opposite directions so that any mass of plastic material placed above and between them is gradually drawn downwards and a thin sheet thereof formed on the hot roll or drum to which it will adhere because said drum is hot. The heat of the drum also initiates a vulcanizing action between the rubber and sulphur in the mass being treated. As the rolls revolve a spiral mass of such sheet or film is wound up on the hot drum, and the successive coils thereof are merged into, and united to form, a homogeneous circular belt by the pressure of the cold, smaller roll, to which none of the material will adhere.

In this way sheets of great density, homogeneity and uniformity may be formed up to half an inch in thickness and more. There is difficulty in getting sufficient heat to the surface of the sheet to carry on the process, beyond an as yet undetermined maximum thickness of sheet.

The sheets when formed to the desired thickness are cut from the drum, given the proper shape for brake liners, etc., and, if sulphur has been incorporated, they are then vulcanized in the usual way.

The main feature of advantage in my invention, so far as the characteristics of the product are concerned, results from the fact that during the kneading of the plastic mass, resting on and between the revolving rolls, the short bits of wire and asbestos, or other fibres or elongated binding materials, are nearly all arranged in planes tangential to the surfaces of the rolls at or before the moment they pass between the rolls, so that in the completed sheet they are found lying in planes substantially parallel to the surfaces of the sheet and extending in a general longitudinal direction in said planes. This produces a sheet of relatively high tensile strength combined with flexibility, the multiplicity of bits of wire and fibre thus arranged acting much like the large number of small bones in a shad. Moreover, the sucking, pulling action of the rolls on the material tends to straighten out a considerable portion of the bits of wire and fibre along the line of their travel between the rolls, so that when they become embedded in the resulting sheet they lie in planes substantially perpendicular to the axis of the heated drum, and consequently are parallel to the side edges of the completed sheets formed on said drum. As a result such sheets have a predominating amount of bits of reinforcing material extending in a general longitudinal direction as the mixture before passing through the rolls necessarily would have equal amounts of such material extending both laterally and longitudinally and consequently such sheets have twice the tensile strength against longitudinal stresses that they have against lateral stresses. When strips are cut from the sheets so as to have this greater strength in the direction of their lengths, it makes them particularly valuable as brake bands, or clutch facings.

In the accompanying sheet of drawings,

Fig. 1 is a perspective view of a simple form of apparatus which may be used in carrying out the process of my invention, parts being broken away, Fig. 2 is a similar view of a brake band embodying one product of my invention, Fig. 3 is a diagrammatic view of a sheet of my improved material showing the bits of contained wire exaggerated in size for clearness, and Fig. 4 is a perspective view of a portion of tape, suitable for brake band linings, with parts broken away to show the continuous wires which have been exaggerated in size for clearness of illustration.

In the drawings 1 is the larger roll or hollow drum which may be heated by steam admitted through its hollow shaft 2, journaled in bearings, one of which is shown at 3. The smaller, cold roll 4 is journaled in bearing 5, and the two are pressed together by spring 6. End boards 7, 7, or other convenient guides are employed to keep the plastic mass 8 from running out at the ends of the rolls. When these rolls are rotated in the directions indicated by the arrows the mass 8 is slowly dragged down between them and adheres to the heated roll 1 in a thin compact layer or film which is gradually wound on the drum in a spiral 9, the coils of which spiral coalesce and consolidate, under roll pressure, into a homogeneous layer of uniform thickness. When the desired thickness of sheet is thus attained, the rolls are stopped and separated and the belt of material on roll 1 is slit along a line parallel to its axis, removed from the drum and developed into a flat sheet which is then cut into rings or strips or other desired forms and completely vulcanized, if sulphur has been used.

10, Fig. 2 is such a strip suitable for use as a brake band. The bits of binding material are indicated generally at 11, 11, lying substantially parallel to the longer dimension of the band. The band is applied in the usual way by bending or flexing sections thereof about the periphery of a brake drum and fastening them into place.

In Fig. 3 the bits of wire in a sheet 12 are indicated by 11ᵈ, while the bits of fibre are indicated at 11ᵇ.

In some cases where sheets of more than four feet in width were being made according to my invention it has happened that such a sheet will drop away from the underside of the drum after a certain thickness has been reached in building it up, and so produce wrinkles and blisters or other uneven characteristics in the product. To overcome this I may run continuous reenforcing strands of wires, yarn or threads 15 into the mass 8 and let them wind up in spirals in the belt of material formed on the drum. These reenforcing strands of wires or threads prevent the sheet from falling away from the drum. Also when material so reinforced is cut from the drum these long strands of wires or threads then found embedded therein and running lengthwise thereof, add to its tensile strength, said wires lying in the strip or sheet so formed in a plurality of planes, such location in a plurality of planes being the obvious result of winding the wires into the original belt of material formed on the drum in spirals, as above described.

Taking, as an example, a mixture composed of 75 parts by weight of chopped-up and shredded fragments of old woven asbestos brake bands, 25 parts by weight of a mixture of rubber and zinc oxide in equal proportions, by weight, and the proper amount of sulphur, and treating the same according to the above described process including vulcanization, there will result a dense, tough, flexible body having a hardness of from 15 to 25 on the Brinnell scale according to the extent of vulcanization and a coefficient of friction on steel of 50%, which is considerably higher than that of the average asbestos brake lining. Such product is resistant to oil and has a low water absorption rate,—in short it is a material possessing all the desirable qualities of a brake lining to a very high degree.

In some forms of the product vulcanization may be omitted, and of course the proportions and nature of the constituents may be varied to produce different degrees of hardness, flexibility and other qualities.

Short bits of wire and fibre have previously been embedded in a suitable matrix to form a plastic composition which has been molded in mass form, but in such process the even density resulting from the building up process here described cannot be obtained, nor the even distribution of the wire and fibre in the mass, and the feature of arranging the bits of wire in planes parallel to the surfaces of the sheet, and largely parallel one to another, cannot be secured.

Having described my invention, I claim:

1. As a new article of manufacture, a somewhat flexible composite tape, suitable for use as a brake lining, by bending sections thereof about the periphery of a brake drum and fastening such tape sections to such drum, which tape is formed of a matrix of a vulcanized composition having rubber as a base, short bits of fibre embedded therein and extending generally lengthwise of the tape, and numerous continuous wires also embedded in, and extending from one end to the other of, said tape and lying in a plurality of planes at different depths from the face thereof.

2. As a new article of manufacture a brake lining comprising a tape capable of being flexed about a brake drum, which tape is formed of a hard, vulcanized composition comprising rubber as a base mixed with incombustible mineral matter as a filler, and with numerous continuous wires extending from end to end of said tape and embedded therein at different depths from the surface thereof.

3. As a new article of manufacture, a body of dense, tough, material having embedded therein, and extending approximately parallel to the surface thereof, a plurality of continuous wires arranged in a plurality of groups, the constituent wires of each of said groups lying in a separate plane, and all said planes being parallel one to another and sunk at different depths from the surface of the strip.

4. A homogeneous material of the class described comprising a body of compressed, tough, flexible material having asbestos fibres embedded therein, the fibres all extending in substantially the same direction, long reenforcing strands embedded in the material and extending in the same direction as the fibres, the strands being arranged in a plurality of groups at different depths, the strands in each group lying in separate planes with respect to the strands of other groups.

5. A homogeneous, friction material of the class described comprising a body of dense, tough and flexible material having intermixed short lengths of asbestos and metal embedded therein, the said short lengths all extending in the direction of the length of the body of the material.

6. A friction resisting material of the class described comprising a body of tough, flexible material, intermixed short lengths of asbestos and wire uniformly embedded in the material, the short lengths extending in substantially the same direction, long reenforcing strands embedded in the material and extending in the same direction of the said short lengths.

7. A friction resisting material of the class described comprising a body of tough, flexible material, intermixed short lengths of asbestos and wire uniformly embedded in the material, the short lengths all extending substantially in the same direction, long reenforcing strands embedded in the material, the strands being arranged in a plurality of groups lying at different depths, the strands of each group lying in separate planes with respect to the strands of other groups.

8. Strip brake lining consisting of a multiplicity of thin layers or films formed of a mixture comprising a plastic matrix and short lengths of reinforcing material, said layers being consolidated under the action of heat into a homogeneous mass, a predominating amount of the short lengths of reinforcing material in each of said layers extending generally longitudinally in said strip, said strip being characterized by high tensile strength particularly in a longitudinal direction, flexibility and a high coefficient of friction.

9. Strip brake lining consisting of a multiplicity of thin layers or films formed of a mixture comprising a plastic matrix and short lengths of reinforcing material present in major amounts in said mixture, said layers being consolidated under the action of heat and pressure into a homogeneous mass, a predominating amount of the short lengths of reinforcing material in each of said layers extending generally longitudinally in said strip, said strip being characterized by high tensile strength particularly in a longitudinal direction, flexibility and a high coefficient of friction.

10. Strip brake lining consisting of a multiplicity of thin layers or films formed of a mixture comprising rubber and short lengths of asbestos, said layers being consolidated under the action of heat and pressure in a homogeneous mass, a predominating amount of the short lengths of asbestos in each of said layers extending generally longitudinally in said strip, said strip being characterized by high tensile strength particularly in a longitudinal direction, flexibility, and a high coefficient of friction.

11. Brake lining material comprising, a strip of tough, dense, substantially homogeneous, flexible material formed of spirally wound layers of rubber compound having elongated bits of reinforcing substance embedded therein, a predominating amount of said bits extending generally longitudinally of the strip.

12. A homogeneous brake lining material of the class described comprising a body of dense, tough, flexible material and short lengths of asbestos embedded therein, the said short lengths extending substantially in the direction of the length of the body of the material.

FRANK J. EISENHARDT.